(12) United States Patent
Freese et al.

(10) Patent No.: US 11,230,854 B2
(45) Date of Patent: Jan. 25, 2022

(54) METHOD FOR ERECTING A WIND TURBINE TOWER

(71) Applicant: Wobben Properties GmbH, Aurich (DE)

(72) Inventors: Ewald Freese, Ochtersum (DE); Olaf Stracke, Emden (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/043,507

(22) PCT Filed: Apr. 8, 2019

(86) PCT No.: PCT/EP2019/058788
§ 371 (c)(1),
(2) Date: Sep. 29, 2020

(87) PCT Pub. No.: WO2019/201641
PCT Pub. Date: Oct. 24, 2019

(65) Prior Publication Data
US 2021/0108615 A1 Apr. 15, 2021

(30) Foreign Application Priority Data
Apr. 16, 2018 (DE) ...................... 10 2018 108 945.7

(51) Int. Cl.
*E04H 12/16* (2006.01)
*E04C 5/12* (2006.01)

(52) U.S. Cl.
CPC ............. *E04H 12/16* (2013.01); *E04C 5/122* (2013.01)

(58) Field of Classification Search
CPC ............ E04C 5/122; E04C 5/12; E04H 12/16
See application file for complete search history.

(56) References Cited

U.S. PATENT DOCUMENTS

| 7,752,825 B2 | 7/2010 | Wobben |
| 9,677,275 B2 | 6/2017 | Stracke |
| 2005/0050817 A1 | 3/2005 | Shin |
| 2017/0183872 A1 | 6/2017 | Cordero et al. |

FOREIGN PATENT DOCUMENTS

| DE | 102013225124 A1 | 6/2014 |
| DE | 102013221432 A1 | 4/2015 |
| EP | 1262614 A2 | 12/2002 |
| EP | 2339094 A1 | 6/2011 |
| WO | 2017/039975 A1 | 3/2017 |

*Primary Examiner* — Andrew J Triggs
(74) *Attorney, Agent, or Firm* — Seed Intellectual Property Law Group LLP

(57) ABSTRACT

The object is attained by a method of erecting a wind turbine tower having a plurality of tower segments which are tensioned by means of tensioning members. A plurality of tensioning members is provided and a fixing unit is fixed at an end of the tensioning members. Fixing of the fixing unit is effected by placing a multi-part wedge unit at a free end of the tensioning members which comprise a plurality of tensioning wires. A sleeve is fitted over the wedge unit and a pulling tab is fixed on or at the sleeve. The pulling tab has an opening. A cable is fixed at or in the hole in the pulling tab. The cable with the fixing unit and thus the tensioning members is pulled upwardly. The fixing unit is fixed at a segment of the tower, that is to be fixed. The sleeve is removed before the tensioning member is braced.

5 Claims, 12 Drawing Sheets

METHOD FOR ERECTING A WIND TURBINE TOWER

BACKGROUND

Technical Field

The present invention concerns a method of erecting a wind turbine tower.

Description of the Related Art

In the case of prestressed concrete towers of a wind turbine a multiplicity of tower segments are typically placed one upon the other. Those tower segments typically represent precast concrete parts. In that case a plurality of tensioning wires are combined together to form a bundle and anchored in the region of the foundation of the tower. The other end of the tensioning wires is then fixed in the upper region of one of the tower segments. In that arrangement the tensioning wires are typically guided within the tower wall. That is shown for example in U.S. Pat. No. 7,752,825. Anchoring of the tensioning wires in the lower region of the tower of the wind turbine can be effected for example by means of a hydraulic ram apparatus and the tensioning wires can be fixed by means of a tensioning anchor.

DE 10 2013 221 432 A1 shows a transition between a foundation and a tower of a wind turbine, wherein tensioning wires can be provided within a tower wall or outside a tower wall but within the tower. The lower end of the tensioning wires can be braced by means of a tensioning anchor to a part of the foundation.

Fixing the upper end of the tensioning wires to the tower of the wind turbine however is laborious and complicated.

On the German patent application from which priority is claimed the German Patent and Trade Mark Office searched the following documents: DE 10 2013 221 432 A1, DE 10 2013 225 124 A1, U.S. Pat. No. 7,752,825 B2 and EP 1 262 614 A2.

BRIEF SUMMARY

Provided is a method of erecting a tower of a wind turbine, which permits easier assembly of the tensioning wires.

Provided is a method of erecting a wind turbine tower having a plurality of tower segments which are braced by means of tensioning members. A plurality of tensioning members is provided and a fixing unit is fixed at an end of the tensioning members. Fixing of the fixing unit is effected by placing a multi-part wedge unit at a free end of the tensioning members which comprise a plurality of tensioning wires. A sleeve is fitted over the wedge unit and a pulling tab is fixed on or at the sleeve. The pulling tab has an opening. A cable is fixed at or in the hole in the pulling tab. The cable with the fixing unit and thus the tensioning members is pulled upwardly. The fixing unit is fixed at a segment of the tower, that is to be fixed. The sleeve is removed before the tensioning member is tensioned.

According to an aspect of the present invention the pulling tab is removed from the sleeves before the fixing unit is fixed to the segment to be fixed.

Provided is a wind turbine tower having an external tensioning means. Accordingly the tensioning elements do not extend within the tower wall but outside the tower wall while being in the interior of the tower. After at least two tower segments have been placed one upon the other and on the foundation tensioning of the two tower segments can be implemented. For that purpose an upper end of the tensioning member is pulled upwardly and can be suitably fixed. Provided is a pulling tab which is fixed at an end of the tensioning members and by means of which the tensioning members can be pulled upwardly. In that case a plurality of tensioning members or tensioning wires are combined together. There is therefore provided a tension-resistant attachment point for the tensioning member. For that purpose a multi-part anchor body or a multi-part wedge can be provided around a plurality of tensioning wires (which together are to form the tensioning member). A sleeve can then be pushed over the multi-part wedge. The sleeve can have a thread, by means of which a counterpart thread can be screwed. A tongue can be provided in the sleeve, which presses under the wedges upon being screwed fast. It is possible in that way to prevent inadvertent release of the wedges. A pulling tab can then be suitably fixed. The pulling tab is then used to pull a first end of the tensioning member upwardly and suitably fix it.

BRIEF DESCRIPTION OF THE SEVERAL VIEWS OF THE DRAWINGS

Further configurations of the invention are subject-matter of the appendant claims.

DETAILED DESCRIPTION

Figure 1:
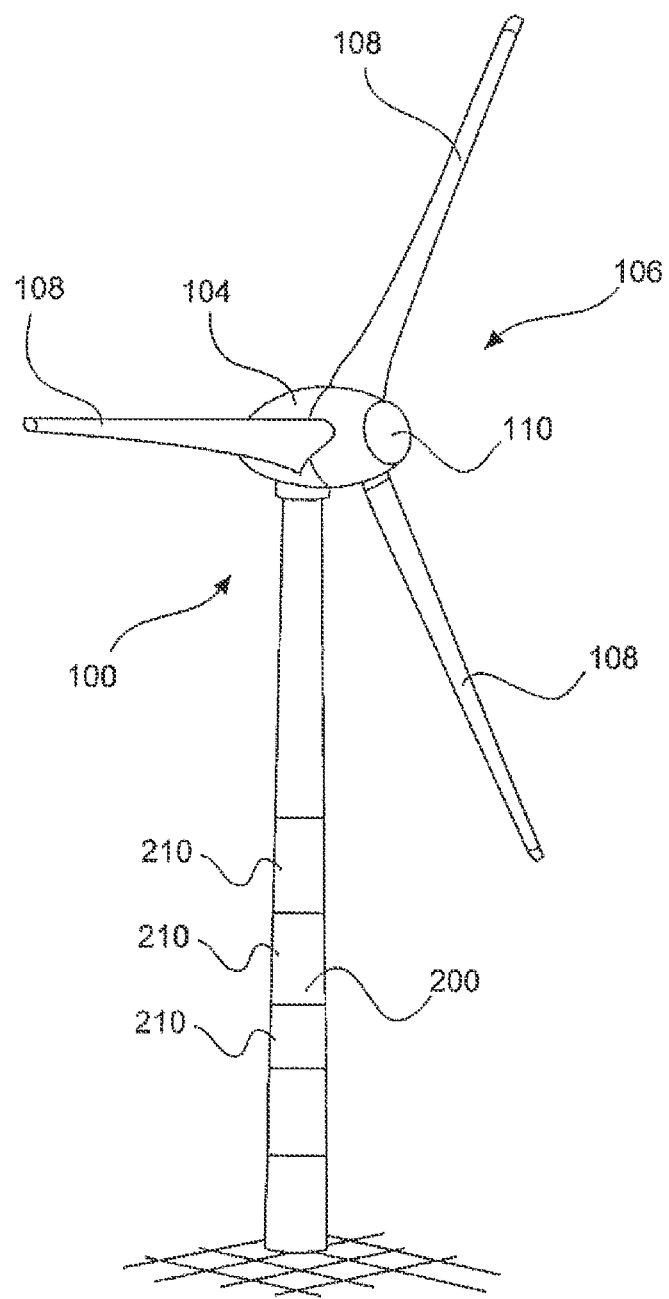
FIG. 1 shows a diagrammatic view of a wind turbine according to the invention.

FIG. 1 shows a diagrammatic view of a wind turbine according to the invention. The wind turbine 100 has a tower 200 comprising a plurality of tower segments 210, a nacelle 104, an aerodynamic rotor 106 with a spinner 110 and three rotor blades 108. The aerodynamic rotor 106 is connected to a rotor of an electric generator (not shown) so that the electric generator generates power upon rotation of the aerodynamic rotor 106.

The segments 210 of the tower 200 preferably represent precast concrete components. As an alternative thereto the tower segments 210 can also represent steel segments.

The tower is a wind turbine tower which is braced by means of tensioning members.

Figure 2:
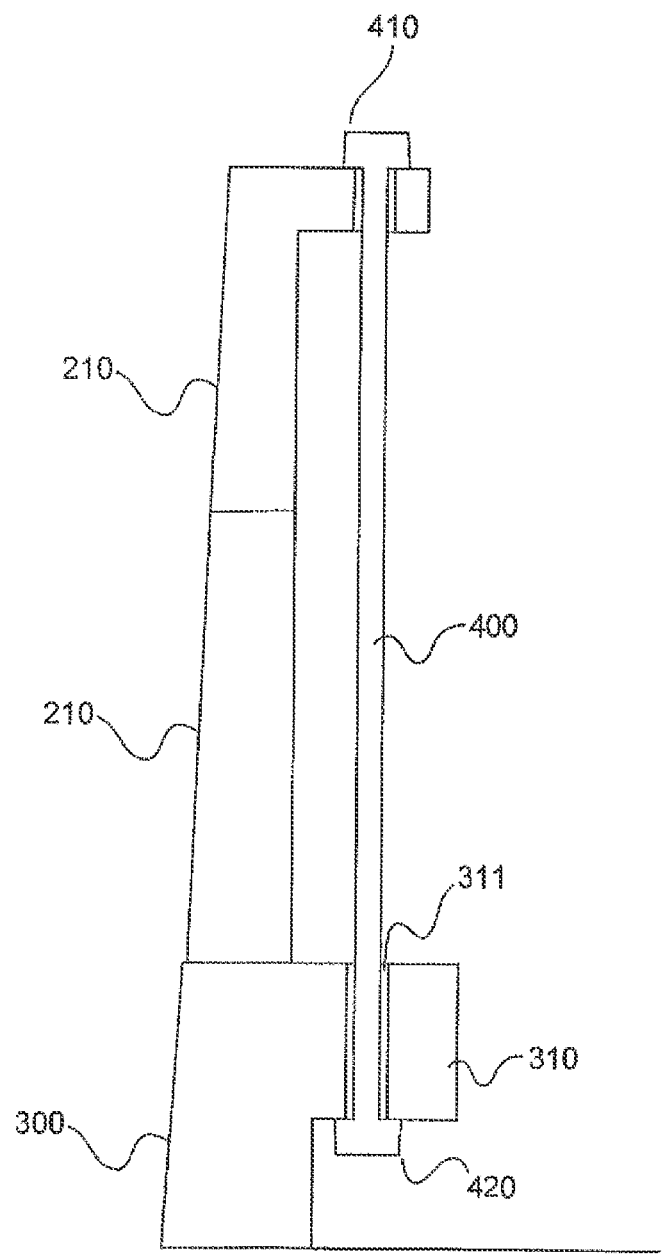
FIG. 2 shows a diagrammatic sectional view of a transition between a foundation and a tower of a wind turbine.

FIG. 2 shows a diagrammatic sectional view of a transition between a foundation and a tower of a wind turbine. FIG. 2 shows in particular the transition between a foundation 300 and a lower region of the tower 200 with the tower segments 210. The foundation 300 can have a sprue attachment portion 310 having a plurality of through bores 311. The tensioning members 400 are passed through the through bores 311 and fixed at the upper end by means of a tensioning anchor 410. A tensioning anchor 420 can also be provided at the lower end. The tensioning members 400 can respectively have a plurality of stranded tensioning wires which are combined together to constitute a tensioning member.

Figure 3:
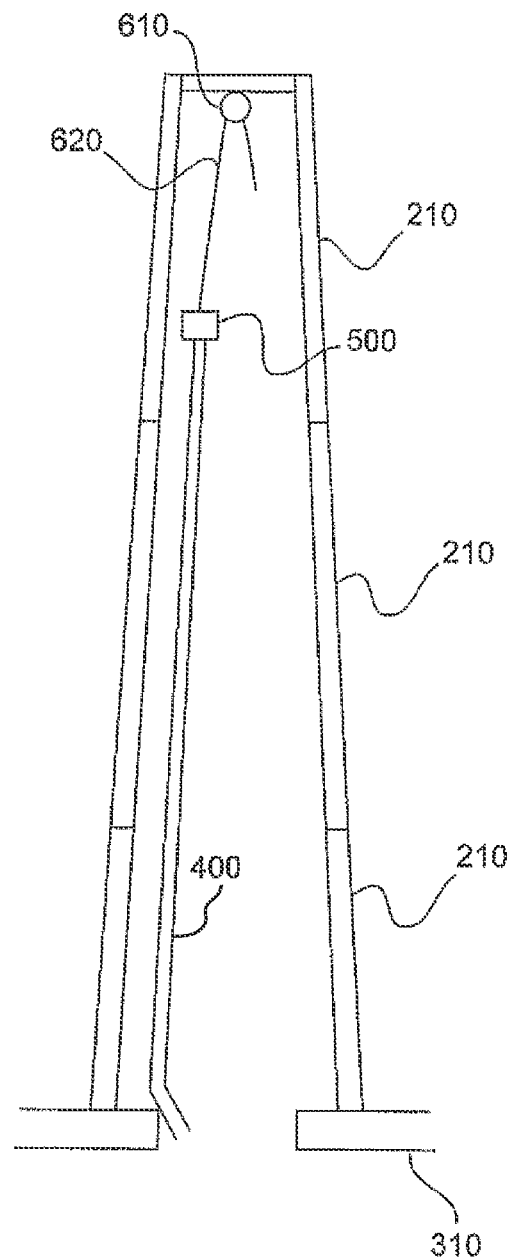
FIG. 3 shows a diagrammatic sectional view of a tower of a wind turbine during erection of the tower.

FIG. 3 shows a diagrammatic sectional view of a tower of a wind turbine during erection of the tower. According to an aspect of the present invention an upper end of a tensioning member 400 can be pulled upwardly by means of a fixing unit 500 and by means of a direction-changing unit 600. For that purpose a cable 620 can be fixed at the fixing unit 500 and the cable 620 can be drawn upwardly by means of a roller system 610.

Figure 4:
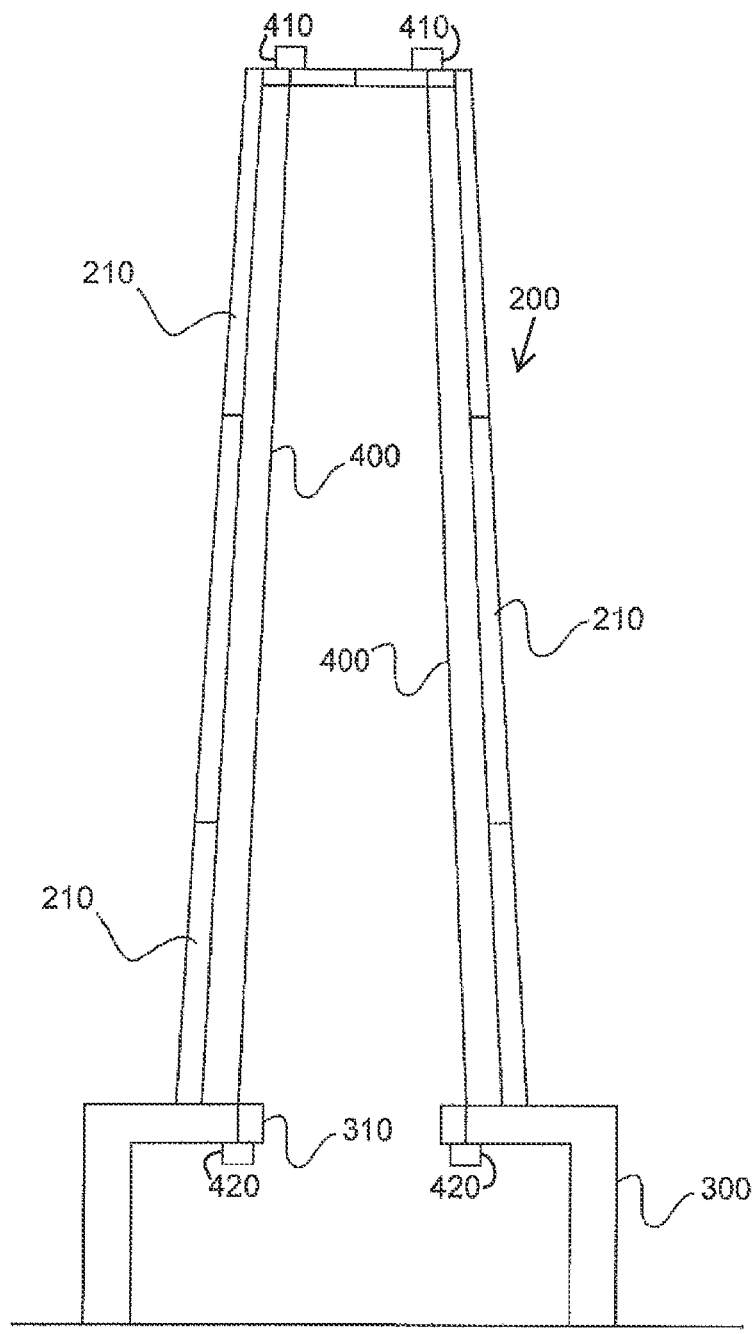
FIG. 4 shows a diagrammatic sectional view of an erected tower of a wind turbine, FIGS. 5A through 5D respectively show a perspective and a diagrammatic view of mounting of a fixing unit for a tensioning member according to an embodiment of the invention.
Figure 5A:
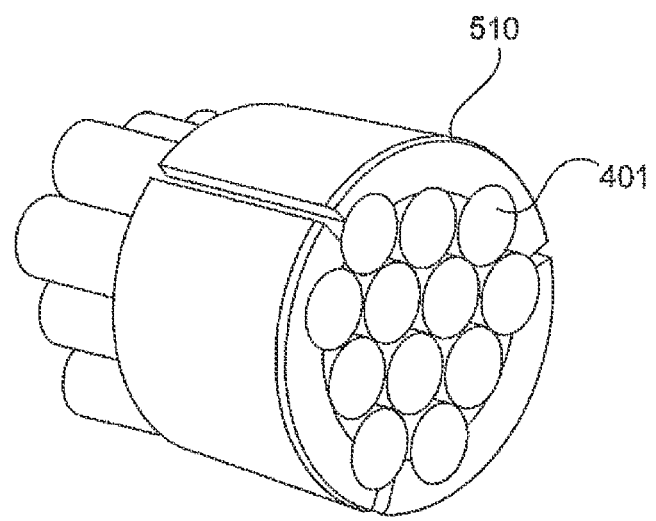
Figure 5B:
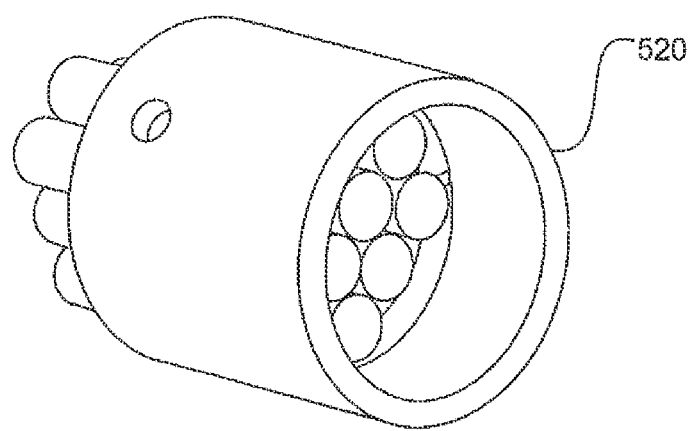
Figure 5C:
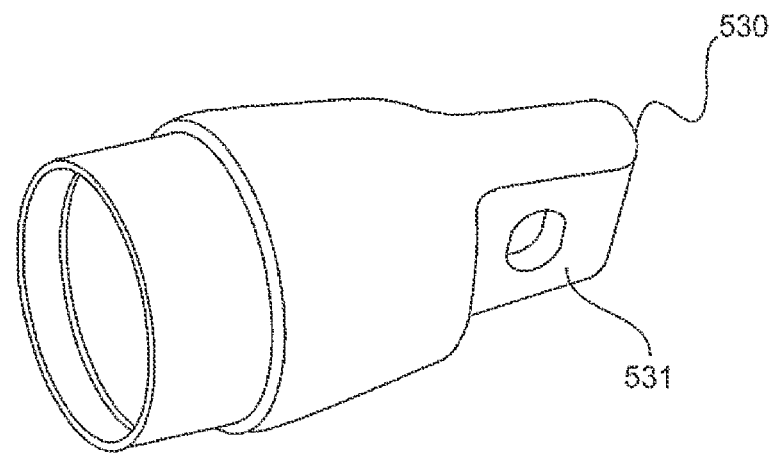
Figure 5D:
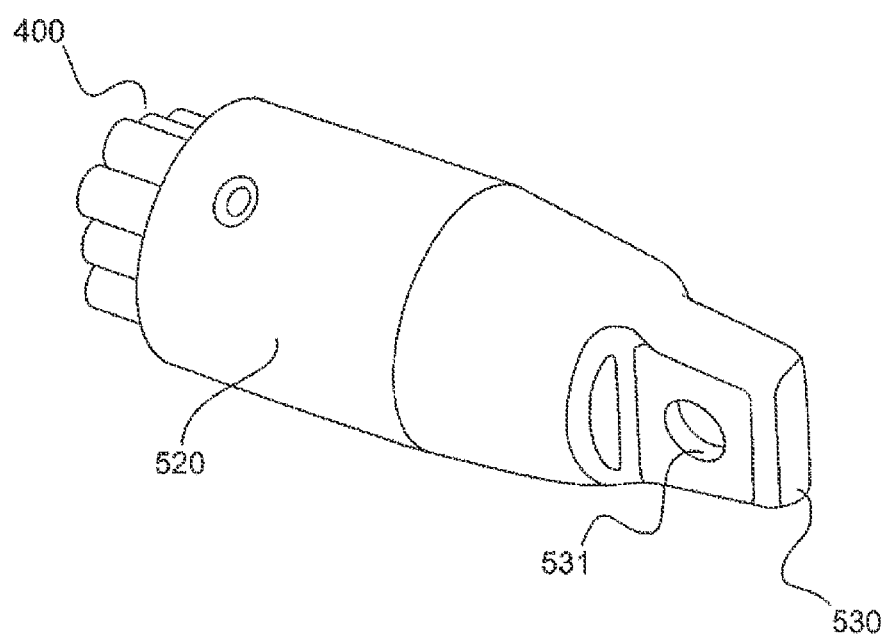

FIG. 4 shows a diagrammatic sectional view of an erected tower of a wind turbine. As shown in FIG. 4 the tensioning members 400 are respectively tensioned at the upper and lower ends with a tensioning anchor 410, 420 so that this provides a braced tensioned tower 200.

FIGS. 5A through 5D respectively show a perspective view and a diagrammatic view of an assembly of a fixing unit for a tensioning member according to an embodiment of the invention. A multi-part wedge 510 is placed around a first end of the tensioning wires 401. A sleeve 520 can then be placed over the wedges 510. Then a pulling tab 530 can be placed over the sleeve 520. For example the pulling tab 530 can be screwed on to a thread on the sleeve 520. The pulling tab 530 can have a hole 531, at which a free end of the cable 620 can be fixed in order to pull the tensioning member upwardly by means of the fixing unit 500.

Figure 6A:
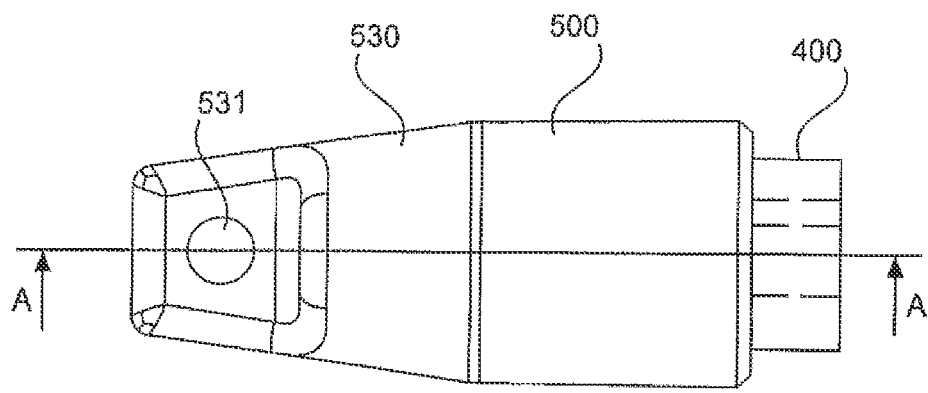
FIGS. 6A through 6E show various views of a fixing unit for a tensioning member according to a second embodiment of the invention.
Figure 6B:
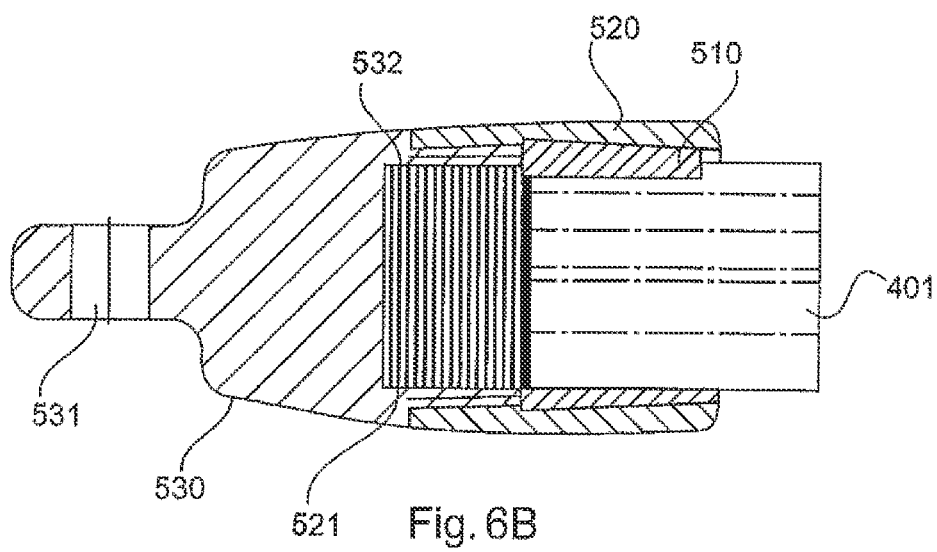
Figure 6C:
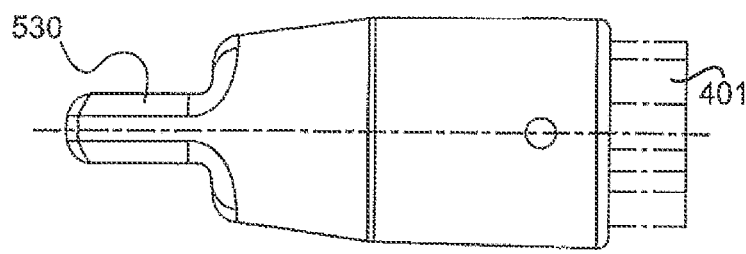
Figure 6D:
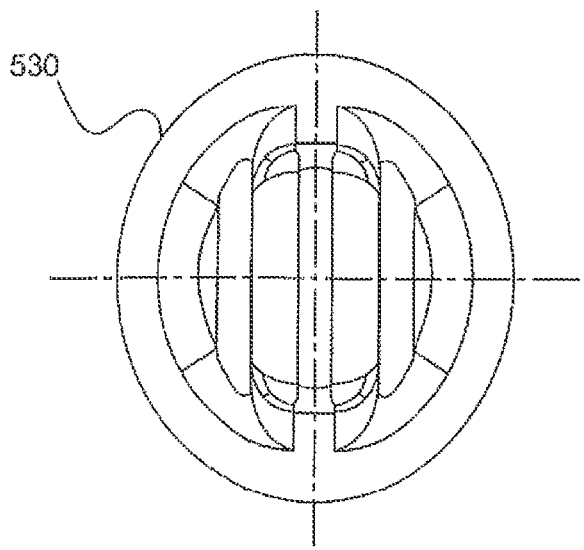
Figure 6E:
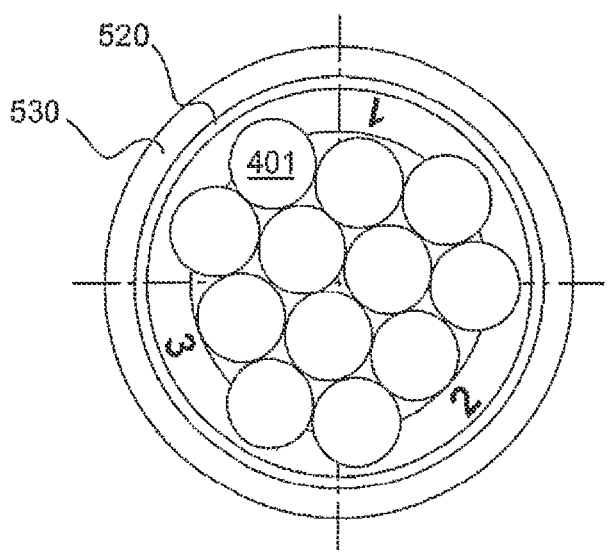

FIGS. 6A through 6E show various views of a fixing unit for tensioning member according to a second embodiment of the invention. FIG. 6A shows a plan view of a fixing unit 500 accommodating a free end of the tensioning member 400. FIG. 6B show a sectional view along line A-A in FIG. 6A. FIG. 6C shows a further plan view of the fixing unit 400. FIG. 6D shows a further view and FIG. 6E shows a diagrammatic sectional view of the fixing unit.

The fixing unit 500 can be seen in particular from FIG. 6B, with a number of details. A multi-part wedge 510 is placed over the ends of the tensioning wires 410. A sleeve 520 is provided over the wedge 510. The sleeve 520 has a thread (female thread or male thread 521). The pulling tab 530 also has a thread 532 which cooperates with the thread 521 of the sleeve so that the pulling tab can be screwed on to the sleeve.

When the multi-part wedge in the form of a multi-part tongue 510 is pushed over the free end of the tensioning wires and when the sleeve 520 is placed thereover then the wedges 510 are wedged so that the tensioning wires 401 cannot drop out.

Figure 7A:
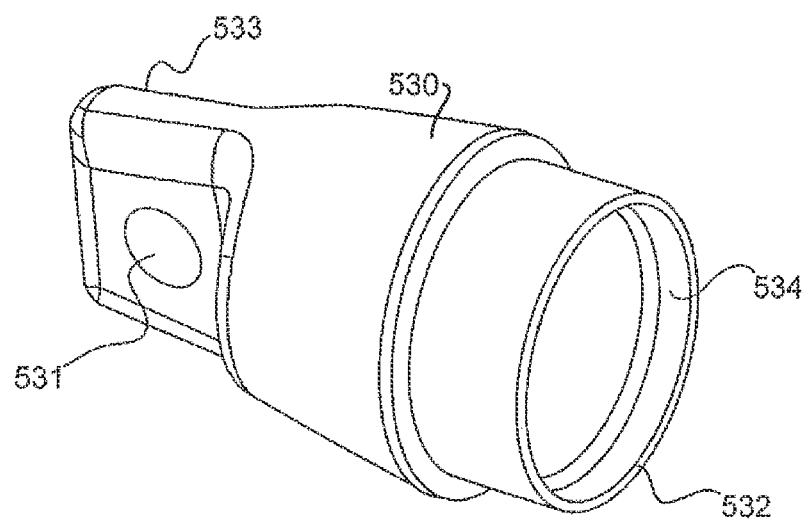
FIGS. 7A through 7D show various views of a pulling tab of the fixing unit for tensioning wires.
Figure 7B:
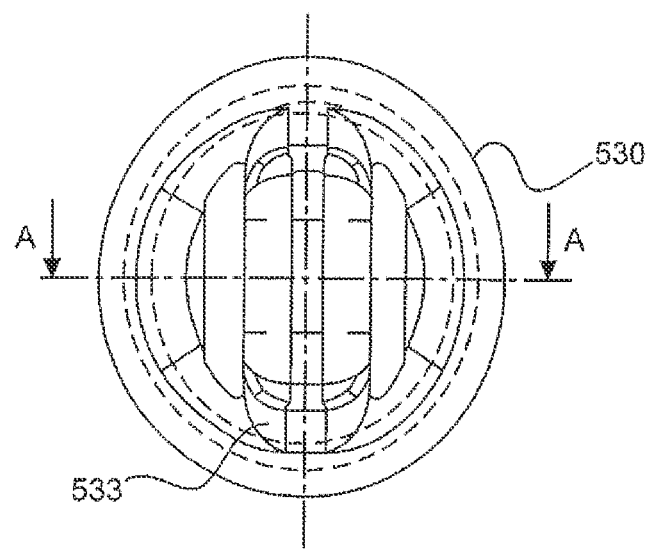
Figure 7C:
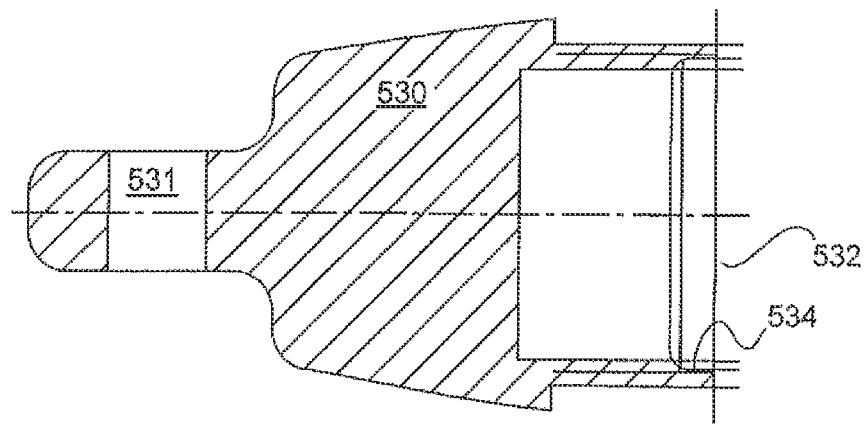
Figure 7D:
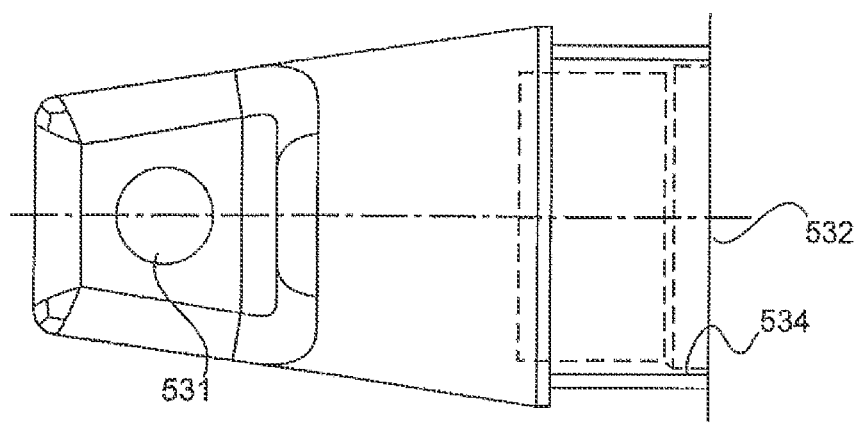

FIGS. 7A through 7D show various views of a pulling tab of the fixing unit for tensioning wires. FIG. 7A shows a perspective view of the pulling tab, FIG. 7B shows a side view of the pulling tab, FIG. 7C shows a sectional view of the pulling tab and FIG. 7D shows a further side view of the pulling tab. The pulling tab 530 has a first end 533 having an opening 531 and a second end 532 having a thread 534. The second end 532 can be of a smaller outside diameter than a central portion of the pulling tab 530. The thread 534 is preferably matched to a thread on the sleeve 520 so that the pulling tab can be screwed on to the sleeve.

Figure 8A:
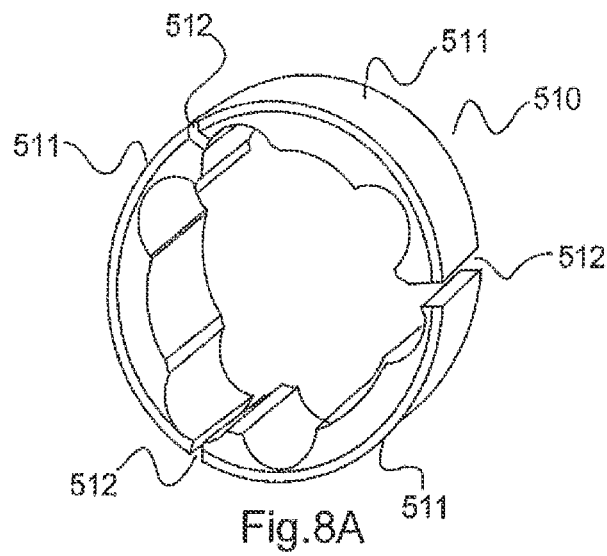
FIGS. 8A through 8C show various views of wedges for the fixing unit.
Figure 8B:
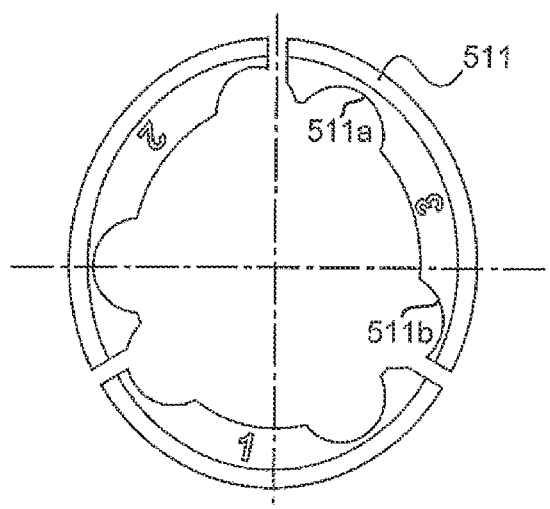
Figure 8C:
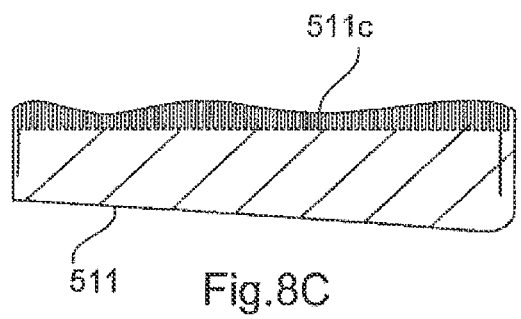

FIGS. 8A through 8C show various views of wedges for the fixing unit. FIG. 8A shows a perspective view of the wedge unit, FIG. 8B show a plan view of the wedge unit and FIG. 8C shows a sectional view of the wedge unit. The wedge unit 510 comprises three wedge portions 511 which have an external cylindrical surface. Preferably two recesses 511a, 511b are provided at the inside of the wedges 511. Those recesses 511a, 511b serve to receive a part of the wires 410 as shown by way of example in FIG. 5A.

The inside of the wedges has a plurality of transverse grooves 511c along the longitudinal direction of the wedges. Those transverse grooves are of a pointed configuration and are intended to serve to provide an improved hold for the tensioning wires in the wedges.

Figure 9A:
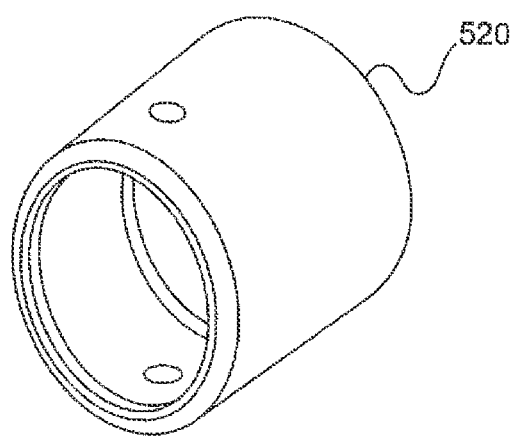
FIGS. 9A and 9B show various views of a sleeve for the fixing unit according to the first and the second embodiment.
Figure 9B:
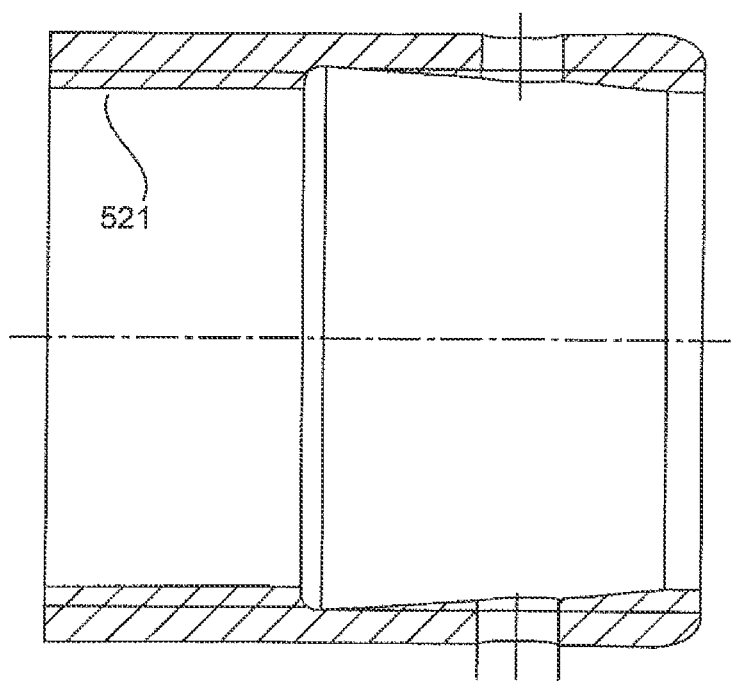

FIGS. 9A and 9B show various view of a sleeve for the fixing unit according to the first and second embodiments. At its one end the sleeve 520 has a thread 521. That thread 521 can cooperate with the thread 534 on the pulling tab 530 in order to screw the pulling tab 530 on to the sleeve 520.

Thus there can be provided a removable fixing for the pulling tab 530 on the sleeve 520. That is advantageous because this means that the pulling tab 530 can be used again when the tensioning member 400 has been fitted and the tower with the tower segments 210 has been bracingly tensioned.

The invention claimed is:

1. A method comprising:
   erecting a wind turbine tower having a plurality of tower segments tensioned by a plurality of tensioning members, the method comprising:
   fixing a fixing unit at first ends of the plurality of tensioning members, wherein fixing the fixing unit includes:
   placing a multi-part wedge unit at the first ends of the plurality of tensioning members, wherein the tensioning members comprise a plurality of tensioning wires;
   fitting a sleeve over the multi-part wedge unit;
   fixing a pulling tab on or at the sleeve, wherein the pulling tab has an opening;
   fixing a cable at the opening in the pulling tab;
   pulling the cable with the fixing unit and the plurality of tensioning members upwardly;
   fixing the fixing unit to a segment of the wind turbine tower for tensioning the plurality of tensioning members; and
   removing the sleeve over the multi-part wedge unit, wherein the sleeve is removed before the plurality of tensioning members are placed in tension.

2. The method as claimed in claim 1 further comprising removing the pulling tab from the sleeve before the fixing unit is fixed to the segment.

3. The method as claimed in claim 2 wherein removing the pulling tab comprises using the cable to remove the pulling tab.

4. The method as claimed in claim 1 wherein second ends of the plurality of tensioning wires are coupled in a region of a foundation.

5. The method as claimed in claim 1 wherein pulling the cable with the fixing unit and the plurality of tensioning members upwardly comprises using a roller system to pull the cable with the fixing unit and the plurality of tensioning members upwardly.

* * * * *

UNITED STATES PATENT AND TRADEMARK OFFICE
CERTIFICATE OF CORRECTION

PATENT NO. : 11,230,854 B2
APPLICATION NO. : 17/043507
DATED : January 25, 2022
INVENTOR(S) : Ewald Freese et al.

Page 1 of 1

It is certified that error appears in the above-identified patent and that said Letters Patent is hereby corrected as shown below:

In the Claims

Column 4, Claim 1, Line 35-36:
"wherein the tensioning" should read: --wherein the plurality of tensioning--.

Signed and Sealed this
Tenth Day of October, 2023

Katherine Kelly Vidal
*Director of the United States Patent and Trademark Office*